(No Model.)
F. E. FREY.
SHAFT AND PULLEY COUPLING.
No. 390,583. Patented Oct. 2, 1888.
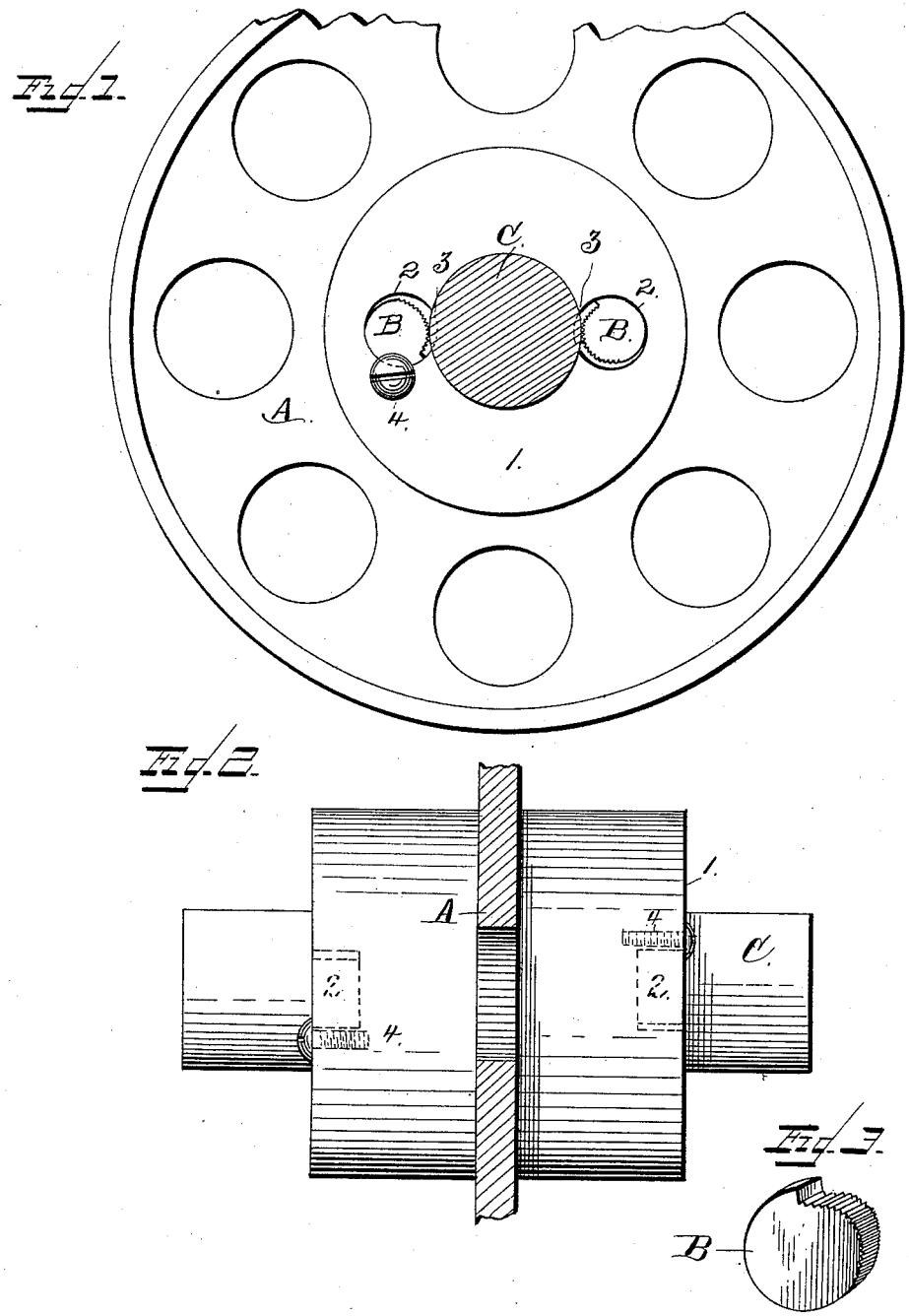
WITNESSES
F. L. Ourand.
J. Thomson Cross
INVENTOR
Frederick E. Frey
by A. G. Keuglman
Attorney

UNITED STATES PATENT OFFICE.

FREDERICK E. FREY, OF BUCYRUS, OHIO.

SHAFT AND PULLEY COUPLING.

SPECIFICATION forming part of Letters Patent No. 390,583, dated October 2, 1888.

Application filed January 11, 1888. Serial No. 260,410. (No model.)

*To all whom it may concern:*

Be it known that I, FREDERICK E. FREY, a citizen of the United States of America, residing at Bucyrus, in the county of Crawford and State of Ohio, have invented certain new and useful Improvements in Automatic Couplings and Fastenings for Pulleys, of which the following is a specification.

My invention has relation to improvements in means for automatically fastening and holding a pulley or gear-wheel on its shaft, and the object is to simplify and improve existing devices heretofore used for the same purposes.

I attain the purposes of my invention by the means illustrated in the accompanying drawings, wherein—

Figure 1 is a side view of a pulley mounted on a shaft and held by my improved devices. Fig. 2 is a front view of same, showing the locking devices in dotted lines. Fig. 3 is a view of the locking-plug.

Reference being had to the drawings, A designates the pulley or gear-wheel, the hub 1 of which has formed in it two circular tubular holes or seats, 2, having an opening, 3, in the side adjacent to the shaft, to permit the surface of the plug or disks to impinge upon the circumferential face of the shaft.

B designates the locking-disk, which consists of an eccentric or cam-shaped disk in circumferential contour and of such length as to exactly fill the circular holes in the hubs of the pulley. To make the locking-connection certain, I mill or serrate the face of the disks, as best shown in Fig. 3 of the drawings. To secure the disks in their seats, I put a small screw, 4, in the surface of the hub and leave the head-flange project over the end of the disk, as shown. This screw, of course, does not contact with the end of the disk so as to prevent it from being moved in the seat.

C designates the shaft, which is fitted to the bore of the hub as usual.

I am aware that various devices of this character have been heretofore used; but I am not aware that a pulley-hub has been made with two circular seats broken away on the side adjacent to the shaft and eccentric-disks arranged therein to be directly impinged by the shaft. This construction, on account of the simplicity and cheapness, commends itself forcibly. It merely requires a flat-bottomed or tubular hole drilled in the hub and a cam-disk or plug arranged in the hole and kept from falling out by some simple means, as described. It is essential that the disks be milled only half-way over their circular faces. I have shown the milling as extending only for a short distance back of the first point of contact, the rest of the face of the disk being smooth to permit it to roll freely. It will be observed that for coupling the disks are reversed to bear with locking force on the shaft.

These improvements may be readily and cheaply applied to pulleys held by the old means by drilling the seats and simply inserting the disks. The disks may be made as a separate article and distributed to the machine-manufacturer ready to be applied. One serious objection to fastening by set-screws is that the end in time grooves the shaft, and there is no automatic force to take up and remedy the defect. Set-screws also throw up beards or edges on the shaft to such an extent that it is impossible to remove the pulley. In my improvements the shaft is not marred to any extent, and the locking-connection is continuously insured. This fastening is particularly applicable to cold-rolled shafts, which become crooked when cut into by a set screw or key-seat; but by these disks the difficulty is largely overcome.

The parts are assembled simply by putting the pulley on the shaft, then inserting the disks, then fitting the fastening-screw in place, and then turning the pulley until the disks forcibly engage the shaft. A reverse of this unlocks the pulley.

What I claim is—

The combination, with the shaft, of the wheel A, formed with circular seats 2, having openings on the sides next to the shaft, cam-shaped disks B, having milled faces loosely arranged in the said circular seats, and a flange-headed screw to hold the disks in their seats, substantially as described, and for the purpose stated.

In witness whereof I have hereunto set my hand in the presence of two attesting witnesses.

FREDERICK E. FREY.

Attest:
A. G. HEYLMUN,
WM. H. BATES.